Sept. 7, 1937.  W. H. BOWDEN  2,092,104
CLUTCH MECHANISM
Filed Aug. 26, 1933
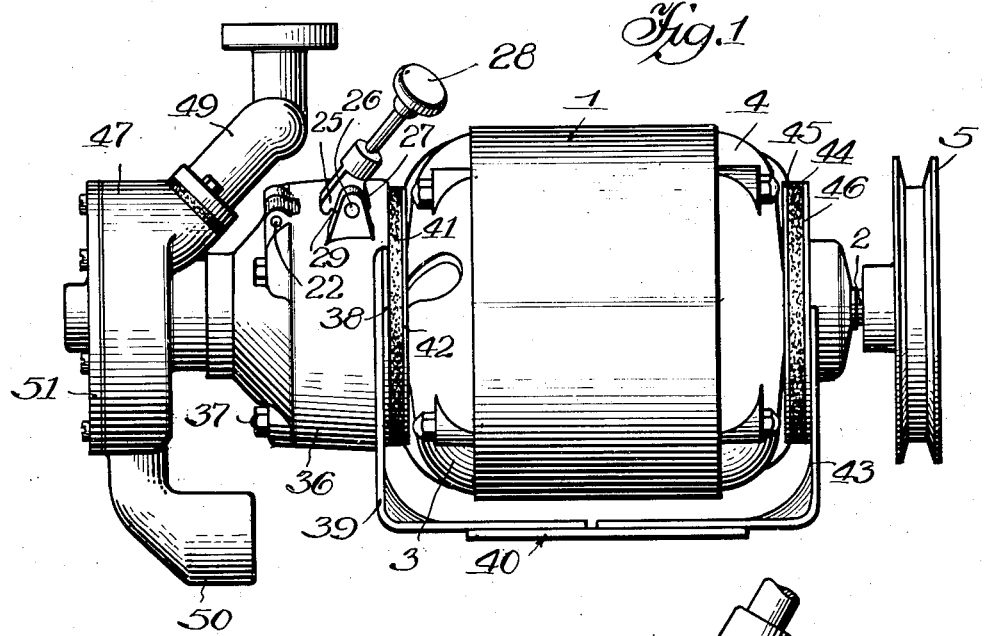
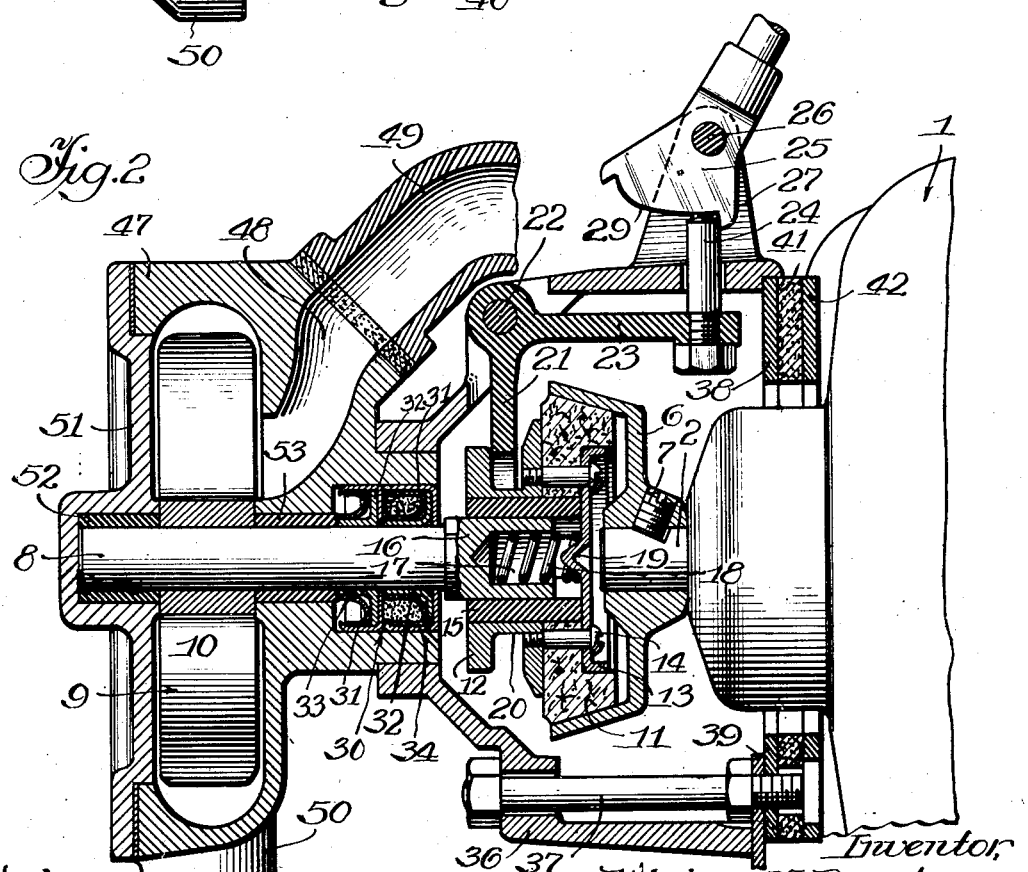
Inventor
William H. Bowden
Parkinson & Lane, Attys.

Patented Sept. 7, 1937

2,092,104

UNITED STATES PATENT OFFICE 2,092,104

CLUTCH MECHANISM

William H. Bowden, Newton, Iowa, assignor to The Maytag Company, Newton, Iowa, a corporation of Delaware Application August 26, 1933, Serial No. 686,880

6 Claims. (Cl. 192—66)

The present invention relates to clutch mechanisms, and more in particular to such a novel construction for a pump or the like for discharging water or other fluid from a container such as a washing machine tub or the like.

Among the objects of the present invention is to provide a novel drive means for directly driving the pump or other structure from the motor or prime mover. In the present embodiment the motor or prime mover is provided with a pulley which may be employed to drive a washing machine, or other device, while the pump attachment and driven shaft are mounted on the motor or prime mover at the opposite side, and are directly connected to the drive shaft thereof.

A further object of the invention is to provide a novel construction of clutch mechanism for operating the fluid discharge pump from the motor or other power plant or prime mover.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment it is to be understood that the same is susceptible of modification and change, and comprehends other details, arrangements of parts, features and constructions without departing from the spirit of the invention.

Referring to the drawing:—

Fig. 1 is a view in side elevation of a discharge pump and driving means therefor.

Fig. 2 is a fragmentary view in vertical cross-section through the clutch construction.

Referring more particularly to the disclosure in the drawing, the embodiment selected to illustrate the invention comprises a motor or other prime mover 1, having a drive shaft 2 journalled in and extending through the opposite end bells 3 and 4. On one end of the shaft is mounted a pulley 5 adapted to drive the operating mechanism of a washing machine or other device. On the opposite end of the drive shaft is mounted a clutch cone 6, which is keyed to the shaft by any suitable means, such as a set screw or the like 7. This clutch cone is adapted to drive a driven shaft 8 of a fluid discharge pump, having an impeller 9 mounted upon a hub 10 suitably keyed or mounted on the driven shaft.

The mechanism for driving the driven shaft 8 comprises a complementary clutch member or face 11, constructed of cork, or the like, mounted upon a clutch hub 12 by means of an end plate 13 and screws or other attaching means 14. This hub is in turn rigidly mounted upon or affixed to and drives a clutch sleeve 15 adapted to receive and drive the enlarged polygonal end 16 of the shaft 8. The hub and sleeve rotate together and are axially slidable on the end 16, while this enlarged part is hollow as at 17 for the reception of a coil spring 18, having its end seating against a shoulder formed in the hollow part, and its opposite end seating against the end plate 13. This end plate is formed with a central depressed portion 19, forming a guide for the spring.

The clutch hub 12 is formed with an annular race 20 for receiving the bifurcations of a shifter yoke 21 pivoted upon a pin 22. The arm 23 of the shifter yoke is provided with an upstanding shifter pin 24 adapted to be depressed by a control cam 25 pivoted at 26 intermediate upstanding lugs or ears 27. This cam is adapted to be operated by means of a handle 28.

The operating surface 29 of the cam is such as to depress the pin 24 when the handle is moved to the left as viewed in Figs. 1 and 2, and thereby move the yoke 21 and clutch hub 12 to the left, which in turn carries the clutch face 11 out of clutching engagement with the clutch cone 6. This movement of the clutch hub and member 11 to the left compresses the spring, which normally has the tendency to force the clutch surface 11 into clutching engagement. The contour of the cam surface 29 when moved to the above position, however, is such as to retain this clutch hub and face 11 out of clutching engagement.

In order to seal the construction against leakage of water from the pump, the invention comprehends a novel oil seal 30. This oil seal is provided with annular rings or sleeves 31 adapted to receive oil seal glands 32 seating upon the shaft. These glands are of leather, or the like, and are retained in position by means of flexible members or springs 33 and washers 34. The grease or lubricant intermediate the rings or sleeves and glands, retains the leather or similar material in a pliable condition and prevents it from becoming hard due to leakage and action of the hot water or other fluid being discharged through the pump, and thereby losing its grip on the driven shaft.

The clutch mechanism is mounted within a housing 36 suitably connected to and carried by the motor casting or housing by means of stud bolts 37 anchored in a steel or metal ring 38 and the bracket 39 of the base or mounting 40 for the motor. This ring 39 is suitably insulated from the motor by means of an insulating ring 41 formed of rubber, or the like, and which in the present instance is vulcanized to the outside ring 38 and an inner metal ring 42, to which the motor is connected. The opposite bracket 43 of the base or mounting 40 for the motor is also insulated from the motor by means of an insulating ring 44 mounted between an inner metal ring 45 connected to the motor and an outer metal ring 46, to which the bracket 43 is attached.

The clutch housing 36 carries a pump housing 47 in which the impeller 9 is mounted. This pump housing is provided with an inlet 48 suitably connected to a conduit or pipe 49 for receiving the fluid discharged from a receptacle such as a washing machine tub or other container. The discharged fluid passing from the pump passes through an outlet 50, to which may be connected a drain hose, or the like. A removable end plate 51 closes the outer end of the pump housing and permits access to the interior thereof. This end plate carries a bushing or bearing 52 for the shaft 8, while another bushing or bearing 53 is mounted in the housing proper.

From the above description and disclosure in the drawing it will be readily apparent that the invention comprehends a novel clutch mechanism.

Having thus disclosed the invention, I claim:—

1. Clutching means for engaging and disengaging the drive and driven shafts of a fluid discharge pump, comprising a clutch member on the drive shaft and a complementary clutch member on the driven shaft, said last mentioned member being adapted to rotate said driven shaft but slidable thereon and including a floating clutch sleeve, a clutch hub mounted on said sleeve, a clutch face of cork adapted to encompass said sleeve, an end plate adapted to retain said cork face upon the complementary clutch member, and means for moving said latter member into or out of clutching engagement with the clutch member on the drive shaft.

2. Clutching mechanism comprising a drive and a driven shaft, a clutch member on the drive shaft, an enlarged part on the driven shaft, a clutch member seating on the enlarged part and adapted to rotate the driven shaft but slidable thereon, an annular groove in the clutch member, a yoke seating in the groove and adapted to move the last mentioned clutch member longitudinally of the driven shaft, tension means carried by an end of the driven shaft tending to move the clutch members into clutching engagement, and cam actuated means for moving the yoke whereby to move the clutch member on the driven shaft out of clutching engagement with the clutch member on the drive shaft.

3. Clutching mechanism comprising a drive and a driven shaft, a clutch element fixed on the drive shaft, a complementary clutch element adapted to rotate the driven shaft, a floating clutch sleeve rotatable with the driven shaft but slidable thereon, a clutch hub mounted on and encompassing the sleeve and carrying said complementary clutch element, means carried by an end of the driven shaft for moving the last mentioned clutch element, hub and sleeve longitudinally of the driven shaft and into clutching engagement with the clutch element on the drive shaft, and means for disengaging the clutch elements.

4. Clutching mechanism comprising a drive shaft and a driven shaft having a polygonal end, a clutch element on the drive shaft, a sleeve on the polygonal end and rotatable with the driven shaft but slidable longitudinally thereof, a clutch hub mounted on the sleeve and provided with a clutch element, tension means in the polygonal end of the driven shaft for moving the last mentioned clutch element into clutching engagement with the clutch element on the drive shaft, and means for disengaging the clutch elements.

5. Clutching mechanism comprising a drive shaft and a driven shaft having a polygonal end, a clutch element on the drive shaft, a sleeve on the polygonal end of and rotatable with the driven shaft but slidable longitudinally thereof, a clutch hub mounted on the sleeve and provided with a clutch element, a spring seating within the polygonal end of the driven shaft for moving the last mentioned clutch element into clutching engagement with the clutch element on the drive shaft, and cam operated means for disengaging the clutch elements against the tension of the spring.

6. Clutching mechanism comprising a drive and a driven shaft, a clutch element on the drive shaft, a clutch sleeve slidable on the clutching end of the driven shaft but rotatable therewith, a clutch hub connected to the sleeve to move therewith and provided with a complementary clutch element, tension means carried in the clutching end of the driven shaft for moving the last mentioned clutch element into clutching engagement with the clutch element on the drive shaft, and means for disengaging these clutch elements.

WILLIAM H. BOWDEN.